(12) United States Patent
Martin et al.

(10) Patent No.: US 11,848,875 B2
(45) Date of Patent: *Dec. 19, 2023

(54) COMMUNICATIONS DEVICE

(71) Applicant: Sony Group Corporation, Tokyo (JP)

(72) Inventors: Brian Alexander Martin, Basingstoke (GB); Matthew William Webb, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 71 days.

This patent is subject to a terminal disclaimer.

(21) Appl. No.: 17/240,035

(22) Filed: Apr. 26, 2021

(65) Prior Publication Data

US 2021/0242984 A1 Aug. 5, 2021

Related U.S. Application Data

(63) Continuation of application No. 16/288,098, filed on Feb. 28, 2019, now Pat. No. 10,992,428, which is a
(Continued)

(30) Foreign Application Priority Data

Jan. 31, 2014 (EP) .................................. 14153536

(51) Int. Cl.
*H04L 5/00* (2006.01)
*H04W 76/14* (2018.01)
(Continued)

(52) U.S. Cl.
CPC .......... *H04L 5/0007* (2013.01); *H04L 5/0032* (2013.01); *H04L 5/0048* (2013.01);
(Continued)

(58) Field of Classification Search
None
See application file for complete search history.

(56) References Cited

U.S. PATENT DOCUMENTS 10,256,949 B2   4/2019  Martin et al.
10,992,428 B2 * 4/2021  Martin .................. H04W 72/21
(Continued)

FOREIGN PATENT DOCUMENTS

CN      103517343 A     1/2014
WO   2009/138820 A1    11/2009
(Continued)

OTHER PUBLICATIONS

Ericsson: D2D scheduling Procedure:, 3GPP TSG-RAN WG2#84, Tdoc R2-134238, San Francisco, USA, Nov. 11-15, 2013 (Year: 2013).*

(Continued)

*Primary Examiner* — Jutai Kao
(74) *Attorney, Agent, or Firm* — XSENSUS LLP

(57) ABSTRACT

A communications device including a transmitter transmitting data signals to a network element of a wireless communications system using shared resources of an uplink of a first wireless access interface included in the network element, a receiver receiving data signals from the network element using shared resources of a downlink of the first wireless access interface, allocations of the shared resources being made by the network element and the uplink of the first wireless access interface is within a first set of resources, and a controller controlling the transmitter and receiver to transmit/receive signals representing data to/from another communications device using a second wireless access interface within a second set of resources formed from resources of the first set of resources for preferable allocation for device-to-device communications by the network element, resources of the second wireless access interface being time divided into at least a data and control regions.

17 Claims, 8 Drawing Sheets

Related U.S. Application Data continuation of application No. 15/111,073, filed as application No. PCT/EP2014/077447 on Dec. 11, 2014, now Pat. No. 10,256,949.

(51) Int. Cl.
*H04W 72/20* (2023.01)
*H04W 72/21* (2023.01)
*H04W 72/04* (2023.01)

(52) U.S. Cl.
CPC ............ *H04L 5/0094* (2013.01); *H04W 72/04* (2013.01); *H04W 72/20* (2023.01); *H04W 72/21* (2023.01); *H04W 76/14* (2018.02)

(56) References Cited

U.S. PATENT DOCUMENTS

| | | | |
|---|---|---|---|
| 2011/0106952 A1* | 5/2011 | Doppler | H04W 72/0406 709/226 |
| 2012/0300662 A1 | 11/2012 | Wang et al. | |
| 2013/0170387 A1 | 7/2013 | Wang et al. | |
| 2013/0223352 A1 | 8/2013 | Sartori et al. | |
| 2013/0322413 A1 | 12/2013 | Pelletier et al. | |
| 2014/0233476 A1* | 8/2014 | Kwak | H04W 72/0413 370/329 |
| 2014/0307697 A1 | 10/2014 | Beale | |
| 2014/0307698 A1 | 10/2014 | Beale | |
| 2014/0321423 A1* | 10/2014 | Kalhan | H04W 72/1215 370/329 |
| 2015/0016428 A1 | 1/2015 | Narasimha et al. | |
| 2015/0119056 A1 | 4/2015 | Lee et al. | |
| 2015/0146687 A1* | 5/2015 | Kim | H04W 36/36 370/331 |
| 2015/0237459 A1 | 8/2015 | Webb et al. | |
| 2015/0319796 A1 | 11/2015 | Lu et al. | |
| 2016/0255647 A1 | 9/2016 | Zhu et al. | |
| 2020/0015241 A1 | 1/2020 | Marinier et al. | |

FOREIGN PATENT DOCUMENTS

| | | |
|---|---|---|
| WO | 2013/074462 A1 | 5/2013 |
| WO | 2013/074463 A1 | 5/2013 |
| WO | 2014/017477 A1 | 1/2014 |
| WO | 2014/017498 A1 | 1/2014 |
| WO | 2014/087145 A1 | 6/2014 |

OTHER PUBLICATIONS

Japanese Office Action dated Jun. 26, 2018 in Japanese Application No. 2016-543224 along with English language translation thereof.
Ericsson: "D2D Scheduling Procedure", 3GPP TSG-RAN WG2 #84, Tdoc R2-134238, San Francisco, USA, Nov. 11-15, 2013.
"CSMA/CA based resource selection", Samsung, published at 3GPP TSG-RAN WG2 #84, R2-133840, Nov. 2013, 4 pages.
"Network control for Public Safety D2D Communications", Orange, Huawei, HiSilicon, Telecom Italia, published at 3GPP TSG-RAN WG2 #84, R2-133990, Nov. 2013, 5 pages.
"The Synchronizing Central Node for Out of Coverage D2D Communication", General Dynamics Broadband UK, published at 3GPP TSG-RAN WG2 #84, R2-134246, Nov. 2013, 3 pages.
"Medium Access for D2D communication", LG Electronics Inc, published at 3GPP TSG-RAN WG2 #84, R2-134426, Nov. 2013, 8 pages.
"D2D Scheduling Procedure", Ericsson, published at 3GPP TSG-RAN WG2 #84, R2-134238, Nov. 2013, 7 pages.
"Possible mechanisms for resource selection in connectionless D2D voice communication", General Dynamics Broadband UK, published at 3GPP TSG-RAN WG2 #84, R2-134248, Nov. 2013, 9 pages.
"Simulation results for D2D voice services using connectionless approach", General Dynamics Broadband UK, published at 3GPP TSG-RAN WG2 #84, R2-134431, Nov. 2013, 6 pages.
Ran Xiaogang, et al., "D2D Resource Allocation under the Control of BS", University of Electronic Science and Technology of China, DCN 16-13-0123-02-000n, https://mentor.ieee.org/802.16/dcn/13/16-13-0123-02-000n-d2d-resource-allocation-under-the-control-of-bs.docx, Uploaded to IEEE on Aug. 10, 2013, 7 pages.
Harris Holma, et al., "Basic System Architecture Configuration with only E-UTRAN Access Network", LTE for UMTS: OFDMA and SC-FDMA Based Radio Access, Wiley, 2009, 4 pages.
"Study on LTE Device to Device Proximity Services", Qualcomm Incorporated, published at 3GPP TSG RAN Meeting #58, RP-122009, Dec. 2012, 6 pages.
"Agreements from TSG RAN on work on Public Safety related use cases in Release 12", Vodafone, et al., published at 3GPP TSG RAN Meeting #61, RP-13177, Sep. 2013, 6 pages.
3GPP TR 23.703, "3rd Generation Partnership Project; Technical Specification Group Services and System Aspects; Study on architecture enhancements to support Proximity-based Services (ProSe)", Release 12, V1.0.0, Dec. 2013, 275 pages.
3GPP TS 29.061, "3rd Generation Partnership Project; Technical Specification Group Core Network and Terminals Interworking between the Public Land Mobile Network (PLMN) supporting packet based services and Packet Data Networks (PON)", Release 10, V10.0.0, Sep. 2010, 155 pages.
"Control Channel Design for D2D link", ZTE, published at 3GPP TSG-RAN WG1 Meeting #75, R1-135369, Nov. 2013, 5 pages.
International Search Report dated Mar. 23, 2015 for PCT/EP2014/077447 filed on Dec. 11, 2014.
Extended European Search Report dated Jul. 31, 2019 in European Application No. 19168783.9.

* cited by examiner

COMMUNICATIONS DEVICE

CROSS-REFERENCE TO RELATED APPLICATIONS

This application is a continuation of U.S. application Ser. No. 16/288,098, filed Feb. 28, 2019, which is a continuation of U.S. application Ser. No. 15/111,073, filed Jul. 12, 2016 (now U.S. Pat. No. 10,256,949), which is based on PCT filing PCT/EP2014/077447, filed Dec. 11, 2014, and claims priority to European Patent Application 14153536.9, filed in the European Patent Office on Jan. 31, 2014, the entire contents of each are incorporated herein by reference.

FIELD OF THE DISCLOSURE

The present disclosure relates to device-device communications and in particular to communications devices, coordinating entities and method for performing device-to-device communications.

BACKGROUND OF THE DISCLOSURE

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced. D2D communications allow communications devices that are in close proximity to directly communicate with each other, both when within and when outside of a coverage area. This D2D communications ability may allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area or when the network fails. Fourth generation networks have therefore been proposed as a cost effective solution to public safety communications compared to dedicated systems such as TETRA which are currently used throughout the world. However, the potential coexistence of conventional LTE communications and D2D communications within a single coverage area or network may increase the complexity of coordinating communications and resource allocation within an LTE network, and may also lead to potential compatibility issues between conventional and D2D capable LTE communications devices.

SUMMARY OF THE DISCLOSURE

According to an example of the present disclosure there is provided a communications device comprising a transmitter for transmitting signals representing data to a network element of a wireless communications system using shared resources of an uplink of a first wireless access interface provided by the network element, and a receiver for receiving signals representing data from the network element using shared resources of a downlink of the first wireless access interface, wherein allocations of the shared resources are made by the network element and the uplink of the first wireless access interface is within a first set of resources. The communications device also comprises a controller for controlling the transmitter and the receiver to transmit and to receive signals representing data to and from another communications device using a second wireless access interface which is within a second set of resources, the second set of resources being formed from resources of the first set of resources for preferable allocation for device-to-device communications by the network element, and resources of the second wireless access interface are divided in time into at least a data region and a control region.

In another example signals transmitted via the control region provide an indication of the allocation of resources within the data region and the controller is configured to control the transmitter and the receiver to transmit and to receive signals representing a resource allocation message in the control region, the resource allocation message providing an indication of a set of resources of the data region, and to transmit and to receive the signals representing data to and from the other communications device using the indicated set of resources.

In another example the first set of resources are within a first frequency range and the second set of resources are within a second frequency range.

In another example the second set of resources is formed in a predetermined set of resources of the first set of resources.

In another example the second wireless access interface includes a reference symbol region for providing reference symbols for channel estimation at a receiving communications device, and the controller is configured to control the transmitter and receiver to transmit and to receive reference signals representing reference symbols in the reference symbol region.

In another example the control region is associated with a reference symbol region, the associated control regions and reference symbols region being contiguous in time.

In another example the controller is configured to control the receiver to receive an indication of the second set of resources from the network element.

In another example the second frequency range is contiguous in frequency and smaller than and within the first frequency range.

In another example the resources of the second set of resources are contiguous in frequency.

In another example the control region of the second wireless access interface is positioned in a predetermined set of resources of the second wireless access interface.

In another example the uplink of the first wireless access interface includes control channels positioned toward the upper and lower frequencies of the first frequency range, and the second frequency range is formed using resources from the shared resources of the first frequency range In another example the second frequency range is contiguous in frequency with at least one of the control channels.

In another example the resources of the second wireless access interface are divided into a plurality of control regions, data regions and reference symbol regions in accordance with a predetermined pattern, and the controller is configured to control the receiver, in response to an absence of a data region resource allocation relating to the communications device in a control region, to enter a reduced-power state.

Examples of the present disclosure can provide a technique for enabling the coexistence of conventional LTE communications and device-to-device communications. A second set of resources within a first set of resources used to provide the conventional LTE wireless access interface are preferably allocated for use in device-to-device communications so that conventional communications devices are not scheduled to transmit or receive signals across the second set of resources. D2D transmissions in the second set of resources therefore appear transparent to communications devices which are not capable of D2D communications or are not currently participating in D2D communications. The provision of the second wireless access interface in the second set of resources allows for a lack of time synchronisation between transmissions in the two wireless access interfaces to result in no or at least reduced interference to one another. This may be particularly beneficial when the second wireless access interface is initially established outside of a coverage area of a LTE network element, and therefore is unlikely to be synchronised with a LTE network element, and subsequently the participating D2D devices enter the coverage area of the network element. The reservation of second set of resources also provides a simple mechanism for the coordination of resource allocation between D2D communications and conventional communications because the network element is simply required to avoid allocating resources of the second set for conventional LTE communications.

The provision of the second wireless access interface over a reserved set of resources allows for the formation of a virtual D2D carrier which includes a data region and a control region. Through the use of such data and control regions, the D2D virtual carrier may operate independently from conventional LTE networks and therefore allows the second wireless access interface to operate both in and outside coverage areas.

Although a D2D virtual carrier may operate independently in terms of control signalling and resource allocation, use of a predetermined second set of resources allows network elements to permanently reserve resources of the first set of resources for the provision of a D2D virtual carrier. This therefore overcomes the need for the first and second resource sets to be altered in order to avoid conflicting resource allocations when a D2D virtual carrier enters the coverage area of a network element. Similarly, although the location of the control region within the second wireless access interface may be varied, providing it in a fixed or predetermined location allows D2D communications devices to enter a reduced power mode in between control transmissions thus reducing power consumption.

Various further aspects and embodiments of the disclosure are provided in the appended claims, including but not limited to coordinating entities and method for performing device-to-device communications.

BRIEF DESCRIPTION OF THE DRAWINGS

Embodiments of the present disclosure will now be described by way of example only with reference to the accompanying drawing in which like parts are provided with corresponding reference numerals and in which.

DETAILED DESCRIPTION OF EXAMPLE EMBODIMENTS

Conventional Communications System

Figure 1:
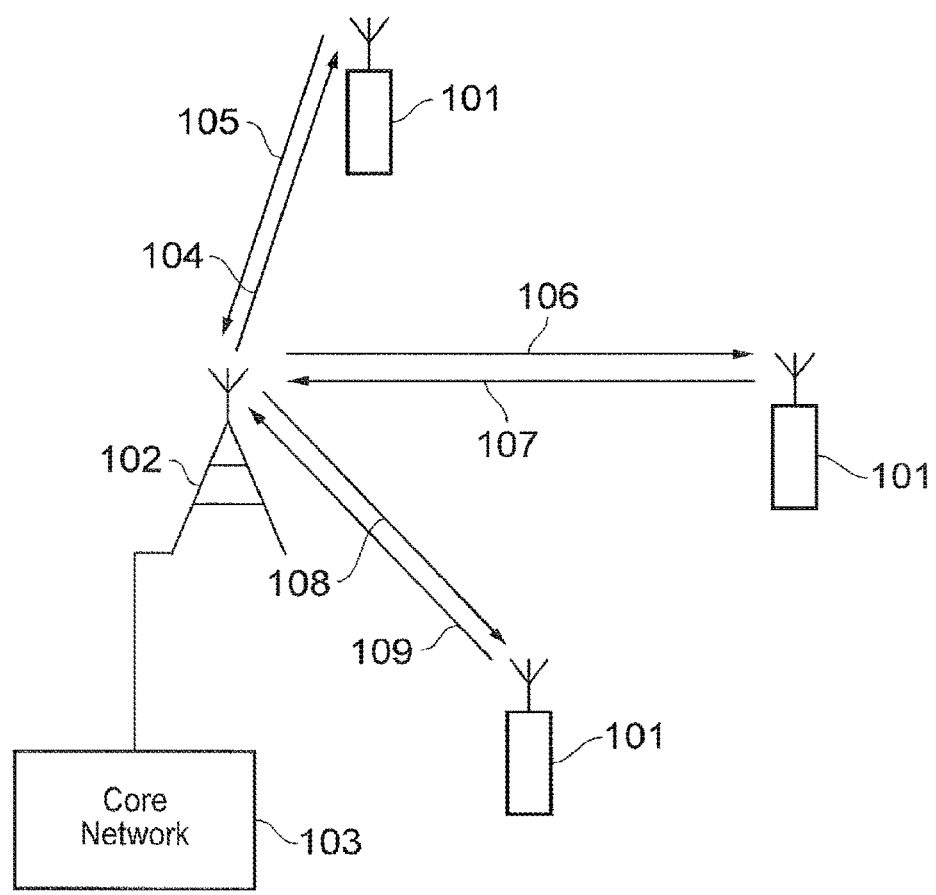
FIG. 1 provides a schematic diagram of a mobile communications system.

FIG. 1 provides a schematic diagram of a conventional mobile telecommunications system 100, where the system includes mobile communications devices 101, infrastructure equipment 102 and a core network 103. The infrastructure equipment may also be referred to as a base station, network element, enhanced node B (eNodeB) or a coordinating entity for example, and provides a wireless access interface to the one or more communications devices within a coverage area or cell. The one or more mobile communications devices may communicate data via the transmission and reception of signals representing data using the wireless access interface. The network entity 102 is communicatively linked to the core network 103 where the core network may be connected to one or more other communications systems or networks which have a similar structure to that formed from communications devices 101 and infrastructure equipment 102. The core network may also provide functionality including authentication, mobility management, charging and so on for the communications devices served by the network entity. The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications devices and 105, 107 and 109 represent the uplink communications from the communications devices to the network entity. The communications system 100 may operate in accordance with any known protocol, for instance in some examples the system 100 may operate in accordance with the 3GPP Long Term Evolution (LTE) standard where the network entity and communications devices are commonly referred to as eNodeB and UEs, respectively.

Figure 2:
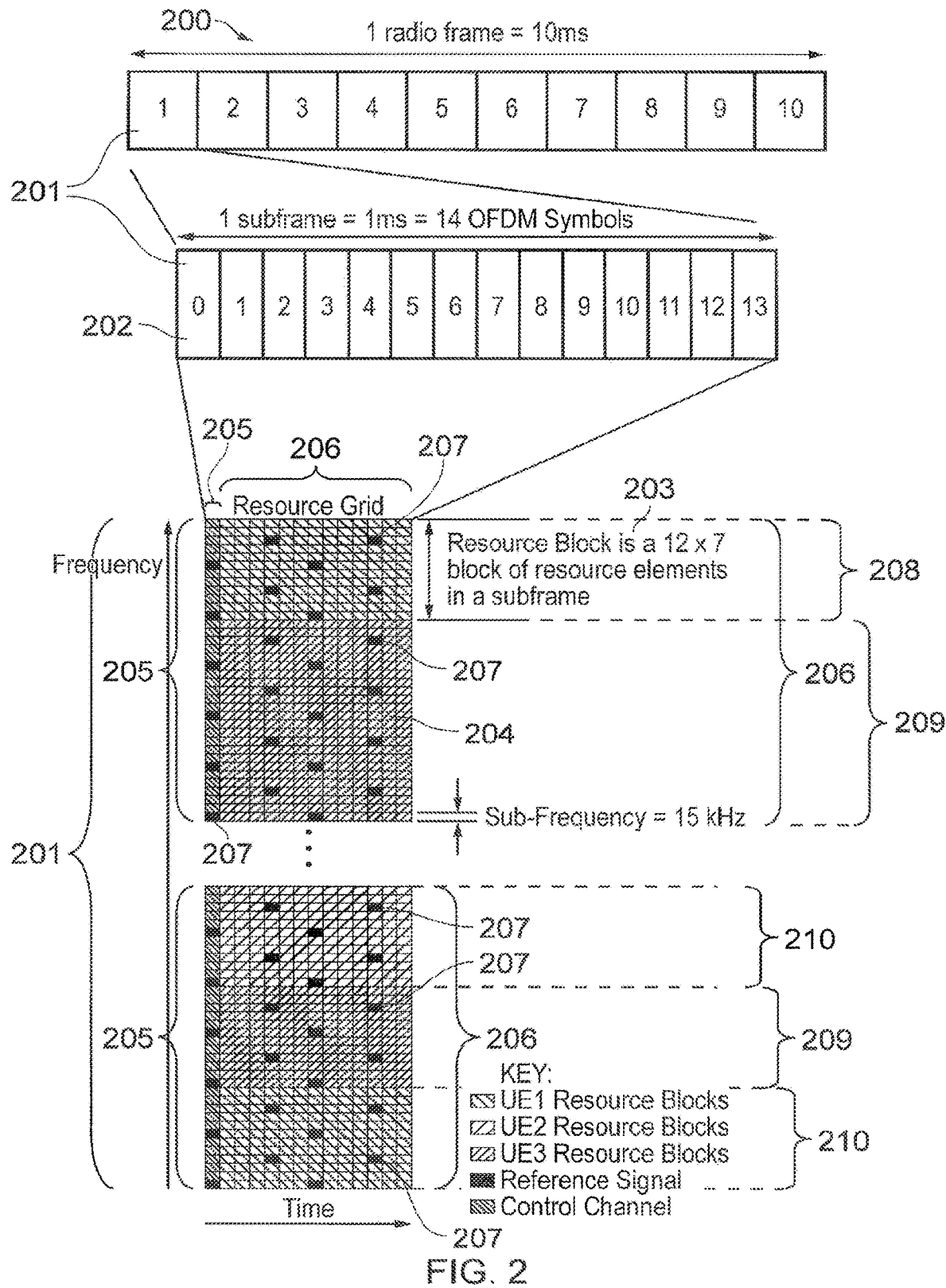
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 last 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals, which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data, such as a physical downlink shared channel (PDSCH) and a physical broadcast channel (PBCH). Further information on the structure and functioning of the physical channels of LTE systems can be found in [11].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH. In order to achieve this, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
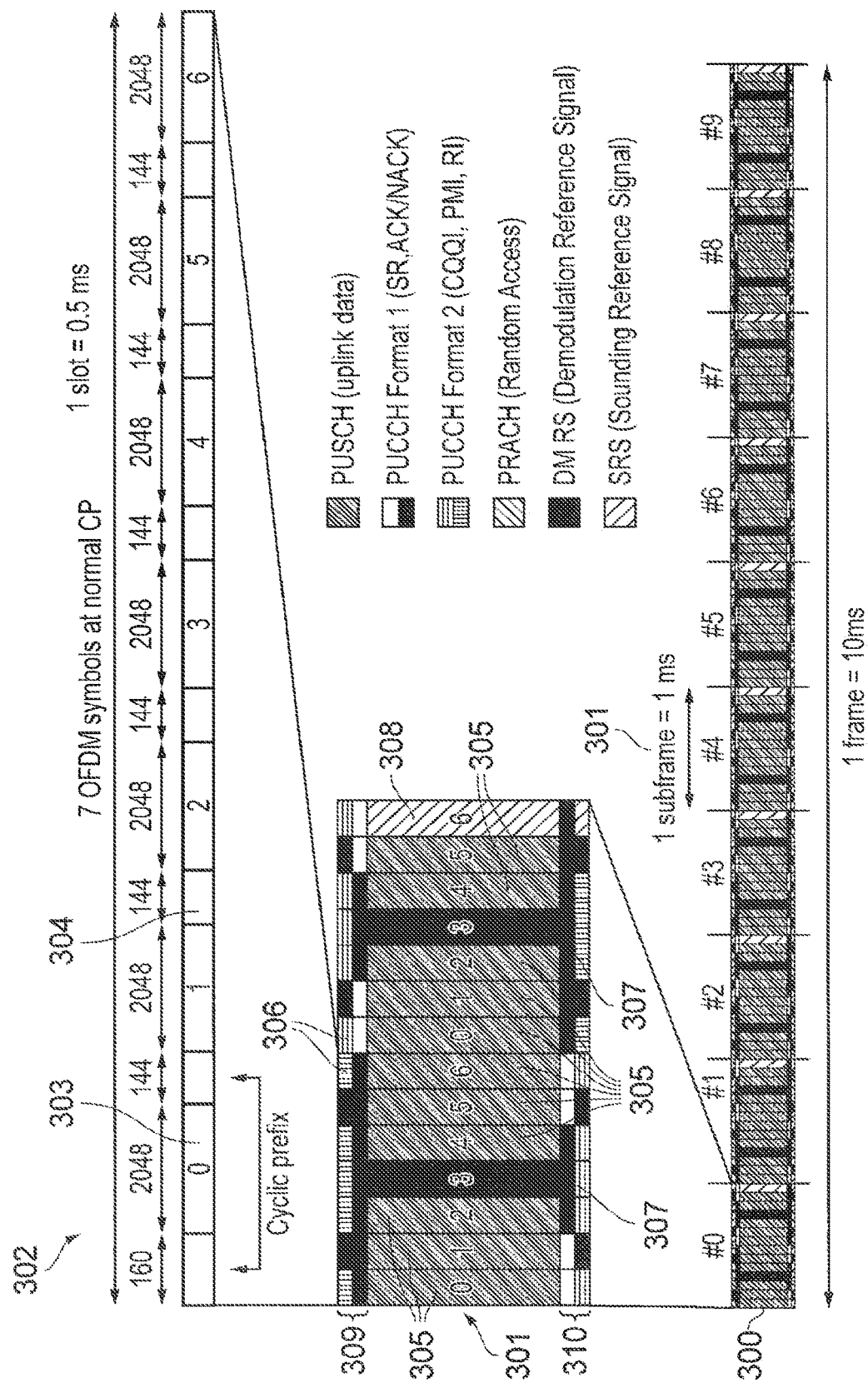
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be used for UE connection initiation and may be scheduled in any of the resources of an uplink frame in accordance with a one of a plurality of PRACH patterns that may be signalled to UE in downlink signalling such as system information blocks. As well physical uplink channels, uplink subframes may also include reference signals. For example, demodulation reference signals (DMRS) 307 and sounding reference signals (SRS) 308 may be present in an uplink subframe, where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [11].

In an analogous manner to the resources of the PDSCH, resources of the PUSCH are required to be scheduled or granted by the serving eNodeB. Therefore if data is to be transmitted by a UE, resources of the PUSCH are required to be granted to the UE by the eNodeB, where uplink grants may for example be indicated to a UE via DCI conveyed by the PDDCH. Uplink resources may be granted by an eNodeB in a number of circumstances, for example a grant may be provided in response to a UE transmitting a scheduling request or a buffer status report to its serving eNodeB.

Although similar in structure to downlink subframes, uplink subframes have a different control structure to downlink subframes, in particular the upper 309 and lower 310 subcarriers/frequencies/resource blocks of an uplink subframe are reserved for control signalling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous. However, in SC-FDM subcarriers are modulated in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Device-to-Device Communications

D2D communications offer the possibility to address the aforementioned problems of network capacity and the requirement of network coverage for communications between LTE devices. For example, if user data can be communicated directly between UEs only one set of resource is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
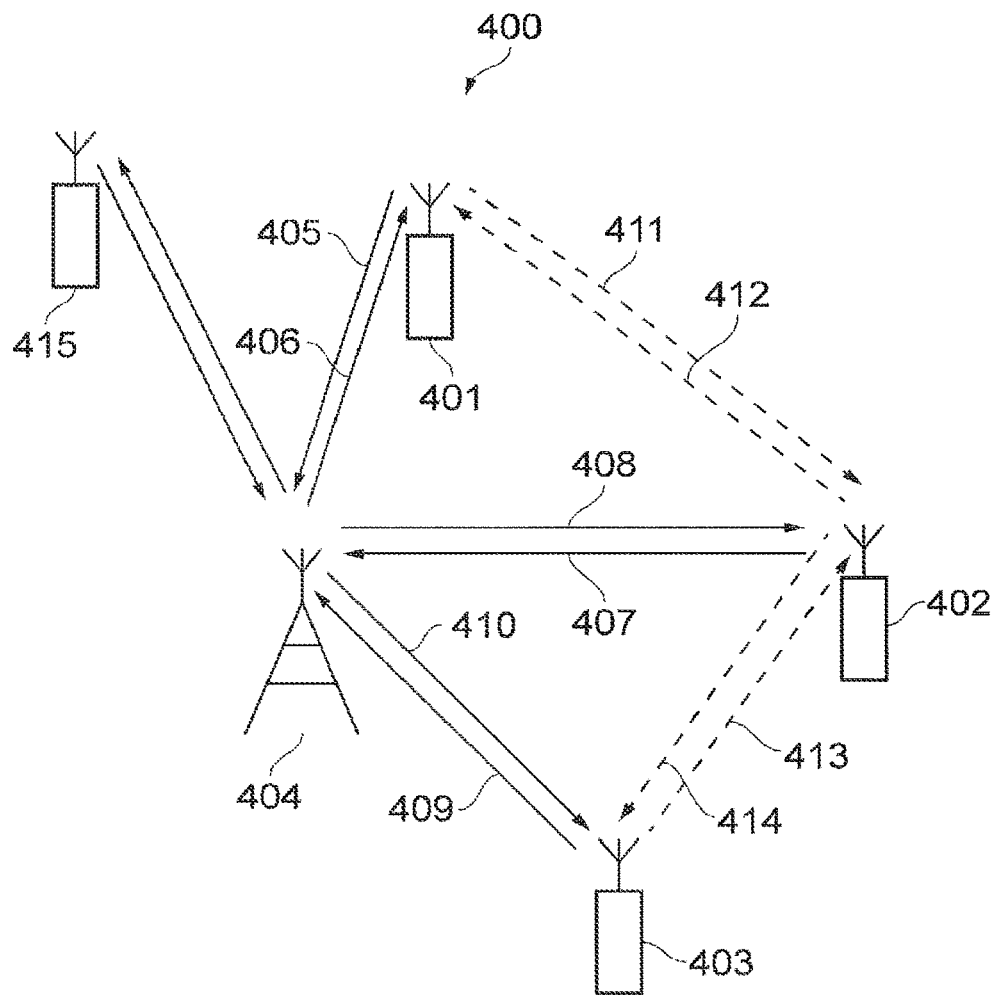
FIG. 4 provides a schematic diagram of a mobile communications system in which communications devices are operable to perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401 402 403 415 and the eNodeB 304 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation such as that illustrated in FIG. 4 may exist in an LTE network where UE 415 is a device not compliant with the specifications for D2D operation.

In FIG. 4, if UE 402 wishes to perform D2D communications with UE 414 as illustrated by the D2D communications link 414, UE 402 may follow a number of possible approaches. In a first example approach, UE 402 may begin broadcasting the data it wishes to transmit without knowledge of whether there are potential receiving UEs within range. Consequently, little or no setup procedure is required. However, although simple, such an approach may result in a reduced probability of a successful transmission compared to a coordinated transmission as little no information is available to UE 402 on the recipients of the transmission. In an alternative approach the transmitting UE 402 may acquire knowledge of the other D2D capable UEs within range prior to transmission and then provide an indication an impending transmission. In an LTE system this may be achieved for example by each UE periodically transmitting a discovery signal containing a unique "discovery" identifier that identifies UEs to one another. Alternatively, a serving eNodeB or coordinating entity may compile a list of UEs within its coverage area capable of performing D2D communications and distribute the list to the appropriate UEs within its coverage area. By virtue of either of the above processes the UE 401 may discover UE 402, UE 402 may discover UEs 401 and 403, and UE 403 may discover UE 402. Once UE 402 is aware of the existence of UE 403, UE 402 may then proceed to transmit data in accordance with any suitable resource allocation procedure.

Previously Proposed D2D Systems

As described above, it has previously been proposed to provide some arrangement for D2D communication within standards which define communications systems according to LTE. A number of possible approaches to the implementation of LTE D2D communications exist. For example, the wireless access interface provided for communications between UEs and eNodeB may be used for D2D communications, where an eNodeB allocates the required resources and control signalling is communicated via the eNodeB but user data is transmitted directly between UEs.

The wireless access interface utilised for D2D communications may be provided in accordance with any of a number of techniques, such as carrier sense multiple access (CSMA), OFDM or a combination thereof for example as well as an OFDM/SC-FDMA 3GPP LTE based wireless access interface. For example it has been proposed in document R2-133840 [1] to use a Carrier Sensed Multiple Access, CSMA, co-ordinations of transmission by UEs, which is un-coordinated/contention based scheduling by each UE. Each UE first listens then transmits on an unused resource.

In another example, UEs may communicate with each other by negotiating access to a wireless access interface directly, thus overcoming the need for a coordinating eNodeB. Examples of previously proposed arrangements include those in which one of the UEs of the group acts as a controlling entity to co-ordinate the transmissions of the other members of the group. Examples of such proposals are provided in the following disclosures:

[2] R2-133990, Network control for Public Safety D2D Communications; Orange, Huawei, HiSilicon, Telecom Italia
[3] R2-134246, The Synchronizing Central Node for Out of Coverage D2D Communication; General Dynamics Broadband UK
[4] R2-134426, Medium Access for D2D communication; LG Electronics Inc In another arrangement one of the UEs of the group first sends a scheduling assignment, and then transmits data without a central scheduling UE or controlling entity controlling the transmissions. The following disclosures provide examples of this de-centralised arrangement:

[5] R2-1342381, D2D Scheduling Procedure; Ericsson;
[6] R2-134248, Possible mechanisms for resource selection in connectionless D2D voice communication; General Dynamics Broadband UK;
[7] R2-134431, Simulation results for D2D voice services using connectionless approach General Dynamics Broadband UK In particular, the last two contributions listed above, R2-134248 [6], R2-134431 [7], disclose the use of a scheduling channel, used by UEs to indicate their intention to schedule data along with the resources that will be used. The other disclosure, R2-134238 [5], does not use a scheduling channel as such, but deploys at least some predefined resources to send the scheduling assignments.

Other example arrangements disclosed in [8] and [9] require a base station to provide feedback to the communications devices to control their transmissions. Document [10] discloses an arrangement in which a dedicated resource exchanging channel is provided between cellular user equipment and device-to-device user equipment for interference control and resource coordination.

Although a number of different wireless access interface arrangements may be used for D2D communications, it is likely that LTE D2D communications will be performed over spectrum allocated to LTE communications. Consequently, it has been previously proposed that when within a coverage area of an LTE network, D2D transmission are performed the uplink spectrum and that SC-FDM is used. Furthermore, as one of the motivating factors behind D2D communication is the increase in capacity that may result, utilising the downlink for D2D communications is may not be appropriate.

As a result of the possible approaches to the organisation of a D2D devices and networks, a number of network topologies may arise. A selection of example topologies are provided by FIGS. 5a to 5d where each may cause different problems regarding the allocation of resources, the operation of D2D communications alongside conventional LTE communication, and the movement of D2D capable devices between coverage areas provided by eNodeBs.

Figure 5A:
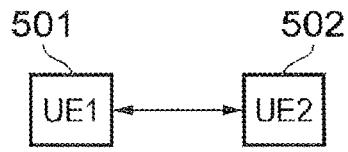
FIGS. 5a to 5d provides schematics diagrams of example device-to-device communications scenarios.

In FIG. 5a UEs 501 and 502 are outside of a coverage area of an eNodeB, consequently, the D2D devices may communicate with no or at least reduced regard for interference that may be caused by their D2D communications to neighbouring LTE networks. Such a scenario may occur in public safety communications for example, where either the UEs are outside of a coverage area or where the relevant mobile communications network is not currently functioning correctly. In such a scenario the communicating UEs may either negotiate directly with one another to allocate resources and coordinate communications, or one of the UEs or a third UE may act as a coordinating entity and therefore perform resource allocation.

Figure 5B:
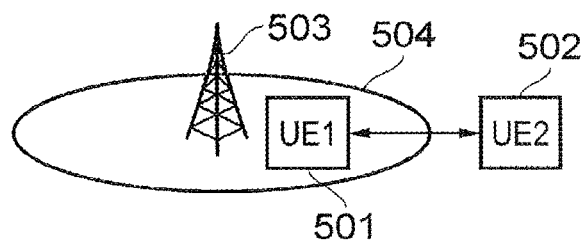

In FIG. 5b UE 501 is within a coverage area 504 of an eNodeB 503 and is performing D2D communications with UE 502 which is outside the coverage area 503. In contrast to the scenario of FIG. 5a, by virtue of UE 501 being within the coverage area of the eNodeB 503, D2D communications may cause interference to conventional LTE communications within the coverage area. Consequently, D2D resource allocations and transmissions may have to be coordinated around those within the coverage area 504 so conventional LTE communications are unaffected by D2D transmissions. This may be achieved in a number of ways, for example the eNodeB may coordinate the resource allocation for the D2D communications so that D2D resources and conventional LTE resources do not overlap. Any allocations may then be relayed to UE 502 by UE 501. Alternatively, UE 1 or UE2 via UE1 may for example perform resource allocation and then inform the eNodeB of the resources being utilised for D2D communications. The eNodeB will then reserve these resources for D2D communications.

Figure 5C:
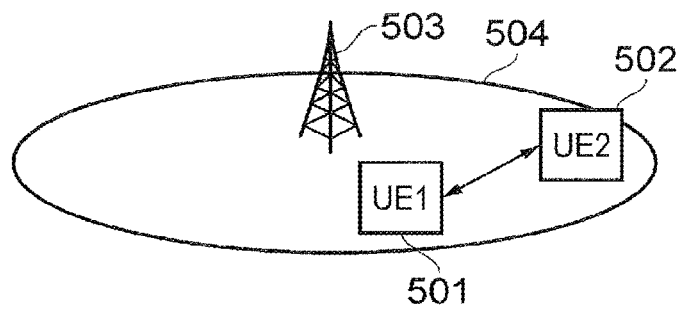

In FIG. 5c both UE 501 and 502 are within the coverage area of the eNodeB 503, consequently, coordination between the eNodeB and UEs will be required if D2D communications are to be performed without causing interference to conventional LTE communications within the coverage area. Such coordination may be achieved in a similar way to that described with reference to FIG. 5b but in the case of FIG. 5c UE 502 is also within the coverage area and therefore the relaying of resource allocation signals by UE1 to the eNodeB from UE 2 may not be required.

Figure 5D:
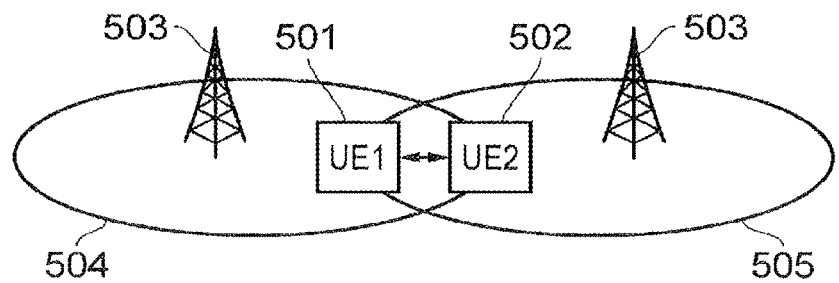

In FIG. 5d a fourth more complex D2D scenario is illustrated, where UE 501 and UE 502 are each within the coverage areas 504 505 of different eNodeBs 503 and 504 respectively. As for the scenarios of FIGS. 5b and 5c, coordination between the UEs performing D2D communications will be required if interference between D2D communications and conventional LTE communications is to be avoided. However, the presence of two eNodeB requires that resource allocations by the eNodeBs within the coverage areas 504 and 505 are required to be coordinated around the D2D resources allocations.

FIGS. 5a to 5d illustrates just four of a large number of possible D2D usage scenarios, where further scenarios may be formed from combinations of those illustrated in FIGS. 5a to 5d. For example, two UEs communicating as shown in FIG. 5a may move into the usage scenario of FIG. 5d such that there are two groups of UEs performing D2D communications in the coverage areas of two eNodeBs.

As previously described it is desirable that D2D communications cause no or as few as reasonable adverse effects on conventional LTE communications when within a coverage area of one or more eNodeBs. Therefore, to accomplish D2D communications in such situations, coordination is required between the UEs wishing the preform D2D communications and the serving eNodeB or predetermined knowledge of D2D resources are required, so that D2D and conventional LTE communications are not scheduled for a same set of resources. Furthermore, it is also desirable that D2D resource allocations and transmission do not interfere with and are transparent to legacy UEs or UEs not currently performing D2D communications. Consequently, an efficient D2D resource allocation procedure that is substantially transparent to other UEs is desirable. In the foregoing description D2D communications are described with reference to an LTE system, however the presently disclosed techniques are equally applicable to other LTE system structures and other systems which are compatible with D2D communications.

Device-to-Device Virtual Carrier

In accordance with the present disclosure, in order to alleviate interference that may be caused by D2D transmissions, a proportion of the resources/frequencies of a frequency range allocated for uplink LTE transmissions is reserved for D2D communications. Consequently, when D2D UEs are within a coverage area, the serving eNodeB can ensure that conventional UEs are not allocated resources in a set of resources reserved for D2D communications, either by transmitting appropriate system information or simply by not scheduling data in the reserved resources. The configuration of the resources within the reserved frequency range/resources may take any form but it may be advantageous if the resources are arranged such that an independent or semi-independent D2D carrier is formed. By virtue of the provision of such a D2D virtual carrier, control resources of the LTE uplink (e.g. PUCCH or PUSCH) may be conserved and scheduling within the D2D virtual carrier performed by participating D2D UEs and or a coordinating entity, with the resulting scheduling information transmitted across the D2D virtual carrier. The use of a D2D virtual carrier independent from an LTE uplink in terms of resource control also enables the D2D virtual carrier to be used outside of coverage areas of LTE networks where resource scheduling may be required to be negotiated directly between UEs or coordinated by a selected UE which acts as a coordinating entity. An illustration of an example implementation of a D2D virtual carrier is provided by FIG. 6, where the allocation of each resource element is shown.

Figure 6:
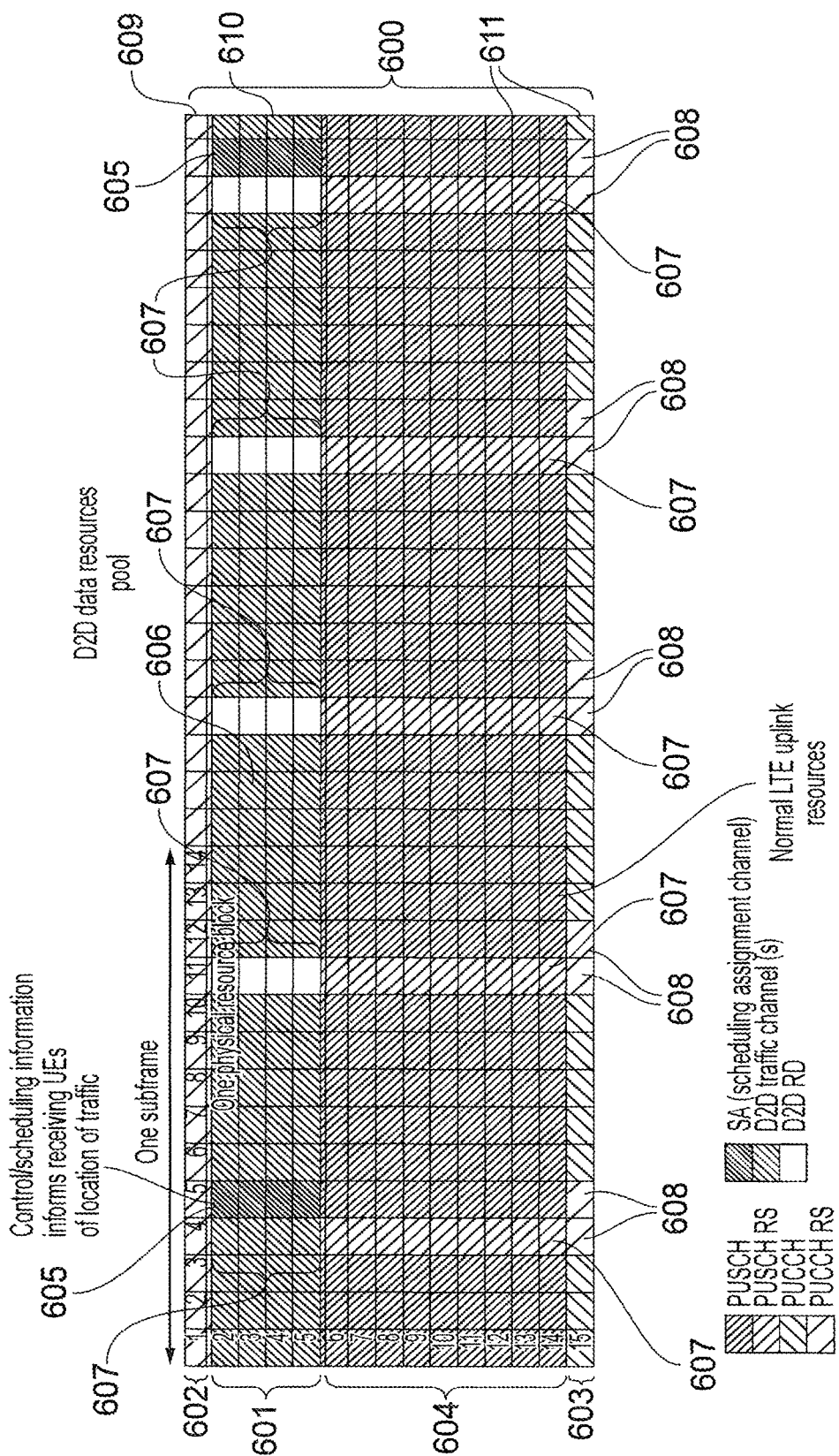
FIG. 6 provides a schematic diagram of a device-to-device virtual carrier within an uplink of a wireless access interface of mobile communications system.

In FIG. 6, an uplink LTE wireless access interface associated with a serving eNodeB spans a first frequency range 600 and comprises a first set of resources 609 to 612, where the channels of the uplink subframes are configured in a similar manner to those described with reference to FIG. 3. However, within the frequency range 600 there is a second set of resources formed from resources 610 which are for preferable allocation for use for D2D communications. The second set of resources 610 is within the first frequency range and is formed from resources of the first set of resources. The second set of resources 610 is in resources conventionally available for PUSCH and PUSCH DMRS, and does not include the resources 609 and 612 in which the PUCCH and PUCCH DMRS are located. Consequently, the structure of the uplink wireless access interface as described with reference to FIG. 3 is maintained in the remainder of the first set of resources outside of the second set of resources. Maintaining this structure, and in particular the control structure, allows the introduction of a set of resources reserved for D2D communications to be transparent to UEs communicating with the EUTRAN in a conventional manner, which is an important consideration when altering the resource allocation of LTE wireless access interfaces. The set of resources 611 encompasses the PUSCH and PUSCH DMRS resources of the uplink which have not been reserved for D2D communications and it is these resources that may be allocated to LTE UEs wishing to perform conventional uplink LTE communications. To further ensure that the reservation of resources for D2D communications appears transparent to UEs not participating in D2D communications, the serving eNodeB preferably does not schedule uplink resources for other UEs in the second set of resources. In some examples, the second set of resources may span or extend across a second frequency range/band 601 which is smaller than the first frequency range/band 600, where the first frequency range is formed from frequencies 601 to 604. The eNodeB may then provide an indication of the second frequency range in system information transmitted in the downlink.

Within the second set of resources 610, a D2D virtual carrier may be established. As described above, the use of a virtual carrier allows D2D communications to be performed independently of a serving eNodeB and therefore enables the D2D virtual carrier to be used both in and out of coverage. To achieve independent operation of the D2D virtual carrier, the second set of resource are temporally divided into at least a control channel/region and a data channel/region, where the control channel may be used for example for conveying scheduling and resource allocation for the resources of the second set of resources such as the data channel. In FIG. 6 the resources 605 are utilised for a scheduling assignment (SA) or control channel, where data conveyed by the SA channel provides an indication of the allocation of the D2D data resource pool 606 or data channel. However, in other examples a control channel of the conventional LTE wireless access interface may be used to convey resource allocation information such that the resource 605 may be used for other control information such as conflict resolution or interference reporting for example for D2D communications The SA channel may occur periodically in the D2D virtual carrier and in some examples may not be present in every subframe or slot and thus a single instance of the SA channel may convey resource allocations for one or more subsequent slots or subframes. In FIG. 6 for example the SA channels provide an indication of scheduling assignments for two subsequent subframes. In FIG. 6 the SA channel is also shown to span substantially the entirety of the second frequency band 601 and although this is beneficial from a bandwidth efficiency perspective due to the preference for contiguous frequency allocations in SC-FDM, in some examples the SA channel may have a bandwidth smaller than that of the second frequency band or resources less than the second set of resources. As well as having a variable bandwidth, the duration of the SA channel may also vary.

The SA channel may operate in accordance with a number of different techniques, examples of which are given below. In the case where the D2D virtual carrier is implemented as an independent carrier without the need for a serving eNodeB, resource allocations within the D2D data resources 606 may be negotiated directly between UEs. For example, a UE that wishes to transmit may provide an indication of the resources it intends to use in the D2D data resources 606 and the intended recipient across the SA channel. If no conflicting resource scheduling transmissions are detected by the UE it will then proceed to transmit the user data in the previously indicated resources. If a conflicting scheduling request is detected, the UE may delay its transmission in accordance with a back-off period, and at the expiry of the back-off period transmit a second resource scheduling indication. However, for such a scheduling request channel to be implemented, a form of contention resolution may also be required in order to resolve situations where multiple requests are transmitted substantially simultaneously.

In a second possible implementation of the SA channel, a UE participating in D2D communications may be selected as a coordinating entity, and scheduling requests then submitted to the coordinating entity via the SA channel. The coordinating entity will then determine resource allocation for example in a similar manner to that performed by an eNodeB in a conventional LTE system.

In a third possible implementation of the SA channel, an eNodeB is required to perform the role of a coordinating entity, where requests for resources are submitted to the eNodeB via the SA channel and the eNodeB then determines resource allocation for the D2D data resources 606. Although this implementation may simplify the process of resource allocation and reduce the burden on individual D2D UEs, the requirement for D2D communications to be performed within a coverage area restricts the scenarios to which D2D communication may be used. Accordingly, the first and second example implementations of the SA channel may provide a more versatile D2D virtual carrier which is capable of operating both inside and outside an LTE coverage area.

As in conventional uplink LTE communications, in D2D communications reference symbols may also be required to be transmitted so that transmissions can be demodulated and estimated accurately at the receiving UE. In an LTE uplink the DMRS provide reference symbols and are transmitted along with data and control by a UE, where the reference symbols are transmitted on the same frequency as the uplink data and thereby at least reduced or no frequency interpolation is required. In FIG. 6 reference symbols are shown to be transmitted in the resources 607 and are transmitted during each slot with a similar periodicity to the DMRS of the conventional LTE uplink. However, the D2D reference symbols may be transmitted according to any periodicity appropriate to the coherence time of the channel over which the D2D UEs are communicating or the need for resources for purposes other than reference symbols or the priority of the data or control the reference symbols are to be used to demodulate for example. The SA channel, reference symbols and data resources may be arranged according to any suitable pattern but it may be advantageous if the reference symbols are transmitted in resources positioned directly adjacent to or in close proximity to those allocated for the SA channel. Transmission in such resource position may then enable the detection and estimation of the information transmitted across the SA channel to be performed with no or at least reduced interpolation of channel estimates formed from the reference symbols. As well as increasing the likelihood of accurate detection and estimation of data transmitted across the SA channel, adjacent positioning of the reference symbols also allows the US to enter a recued-power state such as discontinuous reception (DRX). In particular, the transmission of the reference symbols and SA data in close proximity in time allows UEs to enter a DRX state in between instances of the SA channel when they are not scheduled to receive data. The positioning of the reference symbols and SA channel in a predetermined position or according to a predetermined pattern also assists a UE to reliably exit a DRX state because the UE has knowledge of the position in time of the next SA channel instance. In addition to the DRX benefits, utilising a fixed or periodic position of the SA channel and reference symbols also enables UEs to avoid preforming a blind search to establish the location of the SA channel, thus reducing energy consumption further at the UE.

In an analogous manner to the PDSCH in the LTE downlink described with reference to FIG. 2, the D2D data resources 606 of the D2D virtual carrier may be shared between D2D UEs. Consequently, the above described D2D virtual carrier may be viewed as a virtual D2D downlink where the SA channel has a purpose that corresponds to a PDCCH and the D2D data resources has a purpose that corresponds a PDSCH. These corresponding purposes may enable resource allocation routines that correspond to those used in the LTE downlink to be used for the D2D virtual carrier, thus simplifying the introduction of a D2D virtual carrier in to LTE systems.

The second set of resources could be disposed at any locations within the PUSCH region of the first frequency band or first set of resources. In examples where the second set of resources extends across or is arranged within a second frequency band 601, the second frequency band may be positioned at any point within the PUSCH of the first frequency band when operating within an LTE coverage area. However, when outside of a coverage area the second frequency range and the second set of resources that may be disposed therein may be positioned in any available spectrum, although as described above it is likely that it will still be within spectrum allocated for LTE networks. Although the second frequency band may be flexibly positioned, when within coverage area it may be advantageous if it is positioned adjacent to the upper or lower PUCCH in frequency in order that the remaining PUSCH is contiguous in frequency.

Regardless of the exact positioning of the second set of resources, it is important that when in a coverage area the serving eNodeB has knowledge of the placement of the second set of resources so it may allocate resource of the PUSCH around the second set of resources, thus maintaining compatibility with other UEs. Knowledge of the positioning of the second set of resources may be provided by virtue of it being positioned in predetermined location within the first frequency band so that eNodeBs may permanently reserve the corresponding resources of the PUSCH or reserve these resources when D2D communications or D2D capable UEs are detected. In the case there is the second frequency range within which the second set of resources is disposed, where the second frequency range this may be positioned in a predetermined location relative to an edge or the centre etc. or the first frequency range. Alternatively, the second set of resources may be positioned in any location relative to the first set of resources outside of the frequencies reserved for the PUCCH. In such an approach a D2D UE within a coverage area may detect or be provided with an indication of the uplink structure and initiate the positioning of the D2D virtual carrier accordingly. If a D2D virtual carrier is established when the participating UEs are outside of a coverage area but one or more the participating UEs subsequently enters a converge area, it would be beneficial if the resources allocations of the D2D virtual carrier and conventional LTE uplink do not conflict. To reduce the likelihood of conflicting resource allocations in such a scenario, UEs entering a coverage area may provide an indication of the second set of resources and/or second frequency band to the serving eNodeB which then uses the resources of the uplink accordingly. Alternatively, the serving eNodeB may provide an indication to D2D devices of the second frequency range or second set of resources within the first frequency range which the eNodeB wishes the D2D virtual carrier to operate over and reserve resources of the LTE uplink accordingly. If control of the positioning of the D2D virtual carrier is to be ceded to an eNodeB when UEs performing D2D communications enter a coverage area, the serving eNodeB may require knowledge of the position of the D2D virtual carrier so that resource of the uplink can be reserved or control signals on the SA channel can be transmitted. Knowledge of the positioning of the D2D virtual carrier may for example be provided via the provision of an indication from a UE or via direct detection by the eNodeB.

In FIG. 6 the second set of resources and therefore the virtual carrier are illustrated as being continuous in time. The provision of a time-continuous carrier reduces the need for accurate time synchronisation between transmissions over a D2D virtual carrier and LTE uplink subframes as a lack of time-synchronisation will result in little interference between D2D operation and normal cellular operation. This may be particularly beneficial when UEs that established a D2D virtual carrier outside of a coverage area enter into a coverage area, as the D2D virtual carrier and the LTE uplink frame are unlikely to be synchronised. Once the D2D virtual carrier is operating within an LTE uplink frames the D2D virtual carrier may synchronise with the LTE uplink frames by virtue of the D2D UEs synchronisation within the LTE uplink frames.

The D2D virtual carrier may be implemented in both FDD and TDD LTE systems, where in TDD the virtual carrier will only be provided in uplink LTE subframes, if D2D is restricted to operate in uplink resources. In both FDD and TDD LTE systems the D2D virtual carrier may not be provided in every uplink from but rather provided when requested by a D2D UE or according to a predetermined pattern. For example, in an FDD system resources for a D2D virtual carrier may be reserved by a serving eNodeB for four subframes in each frame so that the effect of the D2D virtual carrier on the capacity of the PUSCH is reduced compared to reserving PUSCH resources for a D2D virtual carrier in all subframes.

Figure 7:
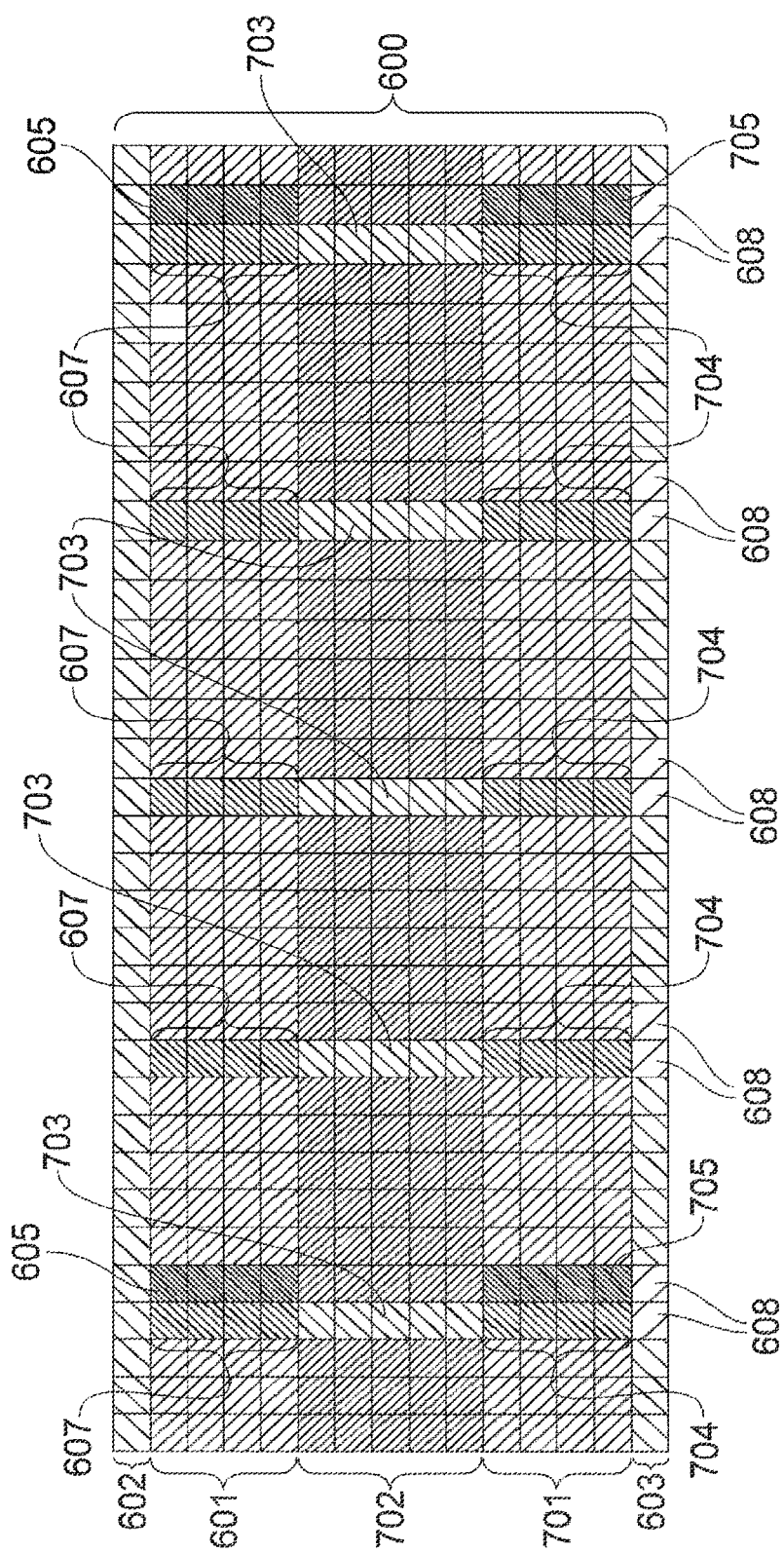
FIG. 7 provides a schematic diagram of a device-to-device virtual carrier within an uplink of a wireless access interface of mobile communications system.

In the example of FIG. 6 a single D2D virtual carrier is provided in the first bandwidth 600, however in other examples two or more D2D virtual carriers may be provided. For example, two independent D2D groups may be operating within the coverage area of a single eNodeB and unless the eNodeB coordinates control signalling between the two groups, it would be advantageous if resources were reserved for two independent D2D virtual carriers or subcarriers. Thus the two D2D groups may operate independently. FIG. 7 provides an illustration of a LTE system where two D2D virtual carriers have been positioned with the uplink of an LTE system.

In FIG. 7 the first D2D virtual carrier is provided across the frequency range 601 in a manner corresponding to that described with reference to FIG. 6. However, a second D2D virtual carrier is also provided in the first frequency range 600. The second D2D virtual carrier is provided across the frequency range 701 where the remaining bandwidth 702 of the first frequency range is used as a conventional PUSCH, where DMRS are provided in the resources 703. The second D2D virtual carrier has a structure similar to the first D2D virtual carrier provided across the frequency range 601, where the reference symbols 704 are provided adjacent to the SA channel 705 according to a periodic pattern. Although the two D2D virtual carriers are illustrated as having a same bandwidth, their bandwidths may be different and in some examples may be dependent on the size of the of corresponding D2D groups and thus the number of UEs that wish to communicate using each D2D virtual carrier. Likewise, the bandwidth of a D2D virtual carrier may be time-varying depending on the resources available in the uplink LTE frames and the capacity requirements of the D2D communications.

Although a D2D virtual carrier may be provided within the frequency range of an LTE uplink wireless access interface, due to the independent nature of the a D2D virtual carrier, resource blocks within the D2D virtual carrier may be altered in size compared to existing resource blocks and in some examples the subcarrier spacing may be altered, therefore providing more flexible resource allocation. However, it would be preferable to limit the subcarrier spacing to the conventional 15 KHz subcarrier spacing or multiples thereof in order to reduce the likelihood of inter-frequency interference.

Figure 8:
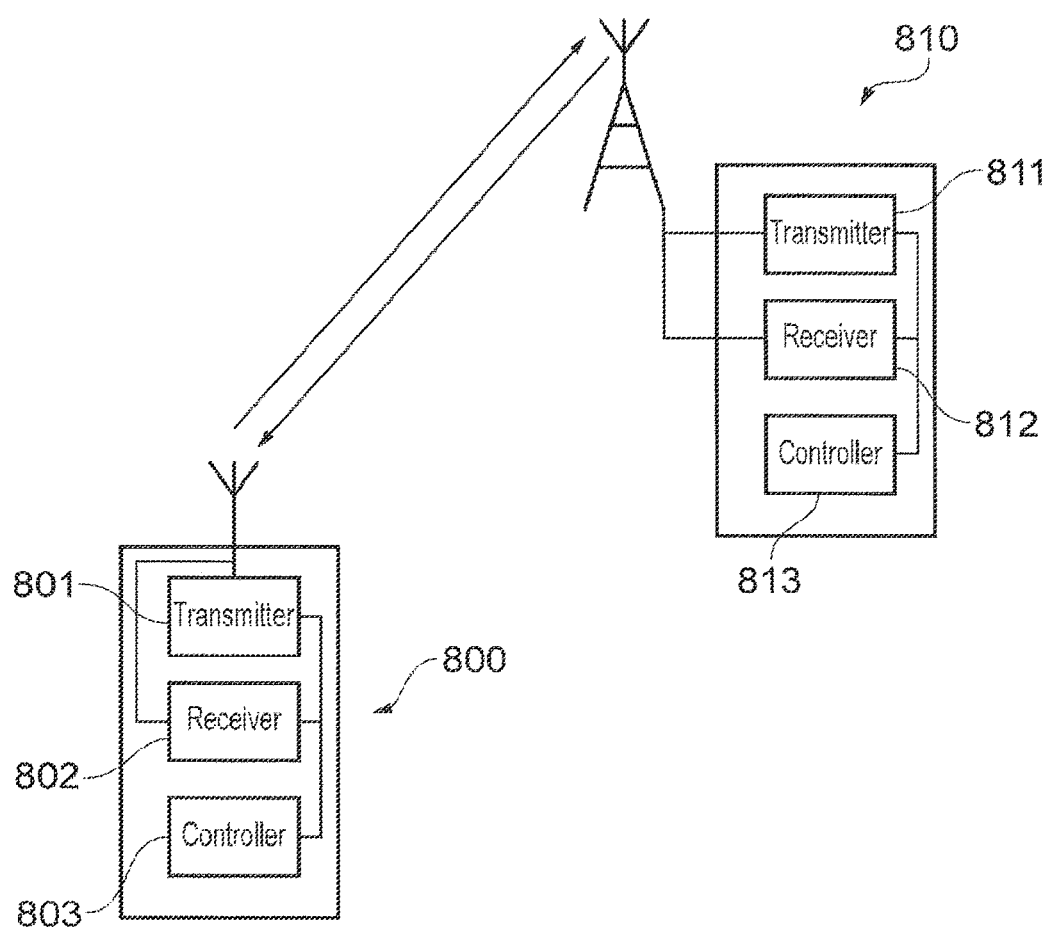
FIG. 8 provides a schematic diagram of a communications device and a network entity of a mobile communications system.

FIG. 8 provides a schematic diagram of a UE 800 and an eNodeB 810 in which examples of the presently disclosed technique may be implemented. The UE includes a transmitter 801, a receiver 802 and a controller 803, where the controller is configured to control the receiver 802 to detect signals representing control data and user data transmitted by the eNodeB 810, and to estimate the data conveyed by the signals. The controller 803 is also configured to control the transmitter 801 to transmit signals representing uplink control data and user data to the eNodeB. In examples where the UE 800 is capable of performing D2D communications, the controller is also configured to control the transmitter 801 and the receiver 802 to transmit and receive signals representing D2D control and user data to and from an eNodeB and other UEs. The UE 800 may also be configured to act as a coordinating entity in a D2D group when members are out of coverage of an eNodeB. Although in FIG. 8 the UE 800 is illustrated as comprising a separate transmitter and receiver, it may instead comprise a transceiver which is configured in combination with the controller to implement the aforementioned features and techniques. The controller 803 may comprise a processor unit which is suitably configured/programmed to provide the desired functionality described herein using conventional programming/configuration techniques for equipment in wireless telecommunications systems. The transmitter 801, receiver 802 and controller 803 are schematically shown in FIG. 8 as separate elements for ease of representation. However, it will be appreciated the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the UE 800 will in general comprise various other elements associated with its operating functionality in accordance with established wireless telecommunications techniques (e.g. a power source, possibly a user interface, and so forth).

The eNodeB 810 includes a transmitter 811, a receiver 812 and a controller 813, where the controller 813 is configured to control the transmitter 811 to transmit signals representing control data and user data to UEs within a coverage area such as the UE 800, thus providing a wireless access interface to UEs within the coverage area. The controller 813 is also configured to control the receiver 813 to detect signals representing user control and uplink data and estimate the data conveyed by these signals. When D2D capable UEs are within the coverage area of the eNodeB 810 the controller 813 at the eNodeB may also acts as a coordinating entity thereby allocating resources of the wireless access interface to D2D communications. Although in FIG. 8 the eNodeB 810 is illustrated as comprising a separate transmitter and receiver, it may instead comprise a transceiver which is configured in combination with the controller to implement the aforementioned features and techniques at the eNodeB. The controller 813 may comprise a processor unit which is suitably configured/programmed to provide the desired functionality described herein using conventional programming/configuration techniques for equipment in wireless telecommunications systems. The transmitter 811, receiver 812 and controller 813 are schematically shown in FIG. 8 as separate elements for ease of representation. However, it will be appreciated that the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the eNodeB 810 will in general comprise various other elements associated with its operating functionality in accordance with established wireless telecommunications techniques. For example, the eNodeB 810 will in general comprise a scheduling entity responsible for scheduling communications. The functionality of the scheduling entity may, for example, be subsumed by the controller 813.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

The following numbered clauses provide further aspects and examples of the present disclosure:

1. A communications device comprising
a transmitter for transmitting signals representing data to a network element of a wireless communications system using shared resources of an uplink of a first wireless access interface provided by the network element,
a receiver for receiving signals representing data from the network element using shared resources of a downlink of the first wireless access interface, wherein allocations of the shared resources are made by the network element and the uplink of the first wireless access interface is within a first set of resources, and
a controller for controlling the transmitter and the receiver to transmit and to receive signals representing data to and from another communications device using a second wireless access interface which is within a second set of resources, the second set of resources being formed from resources of the first set of resources for preferable allocation for device-to-device communications by the network element, and resources of the second wireless access interface are divided in time into at least a data region and a control region.

2. A communications device according to clause 1, wherein signals transmitted via the control region provide an indication of the allocation of resources within the data region and the controller is configured to control the transmitter and the receiver
to transmit and to receive signals representing a resource allocation message in the control region, the resource allocation message providing an indication of a set of resources of the data region, and
to transmit and to receive the signals representing data to and from the other communications device using the indicated set of resources.

3. A communications device according to clauses 1 or 2, wherein the first set of resources is within a first frequency range and the second set of resources is within a second frequency range.

4. A communications device according to any preceding clause, wherein the second set of resources is formed in a predetermined set of resources of the first set of resources.

5. A communications device according to any preceding clause, wherein the second wireless access interface includes a reference symbol region for providing reference symbols for channel estimation at a receiving communications device, and the controller is configured to control the transmitter and receiver to transmit and to receive reference signals representing reference symbols in the reference symbol region.

6. A communications device according to clause 5, wherein the control region is associated with a reference symbol region, the associated control regions and reference symbols region being contiguous in time.

7. A communications device according to any preceding clause, wherein the controller is configured to control the receiver to receive an indication of the second set of resources from the network element.

8. A communications device according to clauses 3 to 7, wherein the second frequency range is contiguous in frequency and smaller than and within the first frequency range.

9. A communications device according to any preceding clause, wherein the resources of the second set of resources are contiguous in frequency.

10. A communications device according to any preceding clause, wherein the control region of the second wireless access interface is positioned in a predetermined set of resources of the second wireless access interface.

11. A communications device according to any of clauses 3 to 10, wherein the uplink of the first wireless access interface includes control channels positioned toward the upper and lower frequencies of the first frequency range, and the second frequency range is formed using resources from the shared resources of the first frequency range 12. A communications device according to clause 11, wherein the second frequency range is contiguous in frequency with at least one of the control channels.

13. A communications device according to any preceding clause, wherein the resources of the second wireless access interface are divided into a plurality of control regions, data regions and reference symbol regions in accordance with a predetermined pattern, and the controller is configured to control the receiver, in response to an absence of a data region resource allocation relating to the communications device in a control region, to enter a reduced-power state.

14. A network element comprising
a transmitter for transmitting signals representing data to a communications device using shared resources of a downlink of a first wireless access interface provided by the network element,
a receiver for receiving signals representing data from the communications device using shared resources of an uplink of the first wireless access interface, wherein allocations of the shared resources are made by the network element and the uplink of the first wireless access interface is within a first set of resources, and
a controller for preferably allocating a second set of resources formed from the first set of resources for use by a second wireless access interface, the second wireless access interface being within the second set of resources and being used for device-to-device communications by the communications device.

15. A network element according to clause 14, wherein the first wireless access interface includes a at least a data channel and a control channel, the control channel providing an indication of the scheduling of the shared resources within the data channel, and the controller is configured to form the second set of resources for preferable allocation for use by the second wireless access interface from resources of the data channel.

16. A network element according to clauses 14 or 15, wherein the controller is configured to control the transmitter to transmit an indication of the second set of resources for preferable allocation for use by the second wireless access interface to the communications device.

17. A network element according to any of clauses 14 to 16, wherein the first wireless access interface includes a control channel and the second set of resources for preferable allocation for use by the second wireless access interface is contiguous in frequency with the control channel.

18. A network element according to any of clauses 14 to 17, wherein the resources of the second wireless access interface are divided in time into at least a control region and a data region, signals transmitted across the control region providing an indication of the allocation of resources within the data region, and the controller is configured to allocate resources of the data region to the communications device and to control the transmitter to transmit signals providing an indication of the allocation of resources of the data region in the control region.

19. A coordinating entity comprising
a transmitter for transmitting signals representing data to a network element of a wireless communications system using shared resources of an uplink of a first wireless access interface provided by the network element,
a receiver for receiving signals representing data from the network element using shared resources of a downlink of the first wireless access interface, wherein allocations of the shared resources are made by the network element and the uplink of the first wireless access interface is within a first set of resources, and
a controller for controlling the transmitter and the receiver to transmit and to receive signals representing data to and from a communications device using resources of a second wireless access interface which is within a second set of resources, the second set of resources being formed from resources of the first set of resources for preferable allocation for device-to-device communications by the network element, and resources of the second wireless access interface are divided in time into at least a data region and a control region each within the second set of resources.

20. A coordinating entity according to clause 19, wherein the controller is configured to control the transmitter and the receiver
to receive resource allocation messages from the communications device, the resources allocation messages including a request for an allocation of resources of the second wireless access interface,
to allocate resources of the data region to the first and second communications devices in response to receiving the resource allocation messages, and
to transmit in the control region signals providing an indication of allocations of resources within the data region to and from the first and second communications devices.

21. A wireless communications system comprising a network element and a plurality of communications devices, the network element comprising
a transmitter for transmitting signals representing data to the communications devices using shared resources of a downlink of a first wireless access interface provided by the network element,
a receiver for receiving signals representing data from the communications devices using shared resources of an uplink of the first wireless access interface, allocations of the shared resources being made by the network element and the uplink of the first wireless access interface is within a first set of resources, and the communications devices comprise
a transmitter for transmitting signals representing data to the network element using the shared resources of the uplink of the first wireless access interface,
a receiver for receiving signals representing data from the network element using the shared resources of the downlink of the first wireless access interface, and
a controller for controlling the transmitter and the receiver to transmit and to receive signals representing device-to-device communications using resources of a second wireless access interface which is within a second set of resources, the second set of resources being formed from resources of the first set of resources for preferable allocation for device-to-device communications by the network element, and resources of the second wireless access interface are divided in time into at least a data region and a control region.

22. A method for communicating data to and from a communications device, the method comprising
transmitting signals representing data to a network element of a wireless communications system using shared resources of an uplink of a first wireless access interface provided by the network element,
receiving signals representing data from the network element using shared resources of a downlink of the first wireless access interface, wherein allocations of the shared resources are made by the network element and the uplink of the first wireless access interface is within a first set of resources, and
controlling a transmitter and a receiver to transmit and to receive signals representing data to and from another communications device using a second wireless access interface which is within a second set of resources, the second set of resources being formed from resources of the first set of resources for preferable allocation for device-to-device communications by the network element, and resources of the second wireless access interface are divided in time into at least a data region and a control region.

23. A method for communicating data to and from a network element, the method comprising
transmitting signals representing data to a communications device using shared resources of a downlink of a first wireless access interface provided by the network element,
receiving signals representing data from the communications device using shared resources of an uplink of the first wireless access interface, wherein allocations of the shared resources are made by the network element and the uplink of the first wireless access interface is within a first set of resources, and
preferably allocating a second set resources formed from the first set of resources and for use by a second wireless access interface, the second wireless access interface being within the second set of resources and being used for device-to-device communications by the communications device.

24. A method for communicating data to and from a coordinating entity, the method comprising transmitting signals representing data to a network element of a wireless communications system using shared resources of an uplink of a first wireless access interface provided by the network element, receiving signals representing data from the network element using shared resources of a downlink of the first wireless access interface, wherein allocations of the shared resources are made by the network element and the uplink of the first wireless access interface is within a first set of resources, transmitting and receiving signals representing data to and from a communications device using resources of a second wireless access interface which is within a second set of resources, the second set of resources being formed from resources of the first set of resources for preferable allocation for device-to-device communications by the network element, and resources of the second wireless access interface are divided in time into at least a data region and a control region each within the second set of resources.

25. Circuitry for a communications device of a wireless communications system, the circuitry comprising a transmitter circuit element for transmitting signals representing data to a network element of a wireless communications system using shared resources of an uplink of a first wireless access interface provided by the network element, a receiver circuit element for receiving signals representing data from the network element using shared resources of a downlink of the first wireless access interface, wherein allocations of the shared resources are made by the network element and the uplink of the first wireless access interface is within a first set of resources, and a controller circuit element for controlling the transmitter circuit element and the receiver circuit element to transmit and to receive signals representing data to and from another communications device using a second wireless access interface which is within a second set of resources, the second set of resources being formed from resources of the first set of resources for preferable allocation for device-to-device communications by the network element, and resources of the second wireless access interface are divided in time into at least a data region and a control region.

26. Circuitry for a network element of a wireless communications system, the circuitry comprising a transmitter circuit element for transmitting signals representing data to a communications device using shared resources of a downlink of a first wireless access interface provided by the network element, a receiver circuit element for receiving signals representing data from the communications device using shared resources of an uplink of the first wireless access interface, wherein allocations of the shared resources are made by the network element and the uplink of the first wireless access interface is within a first set of resources, and a controller circuit element for preferably allocating a second set resources formed from the first set of resources and for use by a second wireless access interface, the second wireless access interface being within the second set of resources and being used for device-to-device communications by the communications device.

27. Circuitry for a coordinating entity of a wireless communications system, the circuitry comprising a transmitter circuit element for transmitting signals representing data to a network element of a wireless communications system using shared resources of an uplink of a first wireless access interface provided by the network element, a receiver circuit element for receiving signals representing data from the network element using shared resources of a downlink of the first wireless access interface, wherein allocations of the shared resources are made by the network element and the uplink of the first wireless access interface is within a first set of resources, and a controller circuit element for controlling the transmitter circuit element and the receiver circuit element to transmit and to receive signals representing data to and from a communications device using resources of a second wireless access interface which is within a second set of resources, the second set of resources being formed from resources of the first set of resources for preferable allocation for device-to-device communications by the network element, and resources of the second wireless access interface are divided in time into at least a data region and a control region each within the second set of resources.

REFERENCES

[1] R2-133840, "CSMA/CA based resource selection," Samsung, published at 3GPP TSG-RAN WG2 #84, San Francisco, USA, 11-15 Nov. 2013.
[2] R2-133990, "Network control for Public Safety D2D Communications", Orange, Huawei, HiSilicon, Telecom Italia, published at 3GPP TSG-RAN WG2 #84, San Francisco, USA, 11-15 Nov. 2013.
[3] R2-134246, "The Synchronizing Central Node for Out of Coverage D2D Communication", General Dynamics Broadband UK, published at 3GPP TSG-RAN WG2 #84, San Francisco, USA, 11-15 Nov. 2013.
[4] R2-134426, "Medium Access for D2D communication", LG Electronics Inc, published at 3GPP TSG-RAN WG2 #84, San Francisco, USA, 11-15 Nov. 2013.
[5] R2-134238, "D2D Scheduling Procedure", Ericsson, published at 3GPP TSG-RAN WG2 #84, San Francisco, USA, 11-15 Nov. 2013.
[6] R2-134248, "Possible mechanisms for resource selection in connectionless D2D voice communication", General Dynamics Broadband UK, published at 3GPP TSG-RAN WG2 #84, San Francisco, USA, 11-15 Nov. 2013.
[7] R2-134431, "Simulation results for D2D voice services using connectionless approach", General Dynamics Broadband UK, published at 3GPP TSG-RAN WG2 #84, San Francisco, USA, 11-15 Nov. 2013.
[8] "D2D Resource Allocation under the Control of BS", Xiaogang R. et al, University of Electronic Science and Technology of China, https://mentor.ieee.org/802.16/dcn/13/16-13-0123-02-000n-d2d-resource-allocation-under-the-control-of-bs.docx
[9] US20130170387
[10] US20120300662
[11] LTE for UMTS: OFDMA and SC-FDMA Based Radio Access, Harris Holma and Antti Toskala, Wiley 2009, ISBN 978-0-470-99401-6.

The invention claimed is:
1. A communications device comprising:
a transmitter configured to transmit signals representing data to a network element of a wireless communications system using shared resources of an uplink in a first frequency range provided by the network element;
a receiver configured to receive signals representing data from the network element using shared resources of a downlink in the first frequency range, wherein alloca- tions of the shared resources are made by the network element and the uplink of a first wireless access interface is within a first set of resources; and circuitry configured to control the transmitter and the receiver to transmit and to receive signals representing data to and from another communications device using a second set of resources in a second frequency range allocated by the network element, the second set of resources being formed for device-to-device (D2D) communications by the network element, wherein the second set of resources are contiguous in time and frequency across an entirety of two contiguous subframes, wherein, within the two contiguous subframes, the second set of resources is divided in the time domain into a single D2D control region, plural D2D data regions and plural D2D reference symbol regions in accordance with a predetermined pattern, wherein the first frequency range and the second frequency range are different, and the first set of resources and the second set of resources are different.

2. A network element comprising:

a transmitter configured to transmit signals representing data to a communications device using shared resources of a downlink in a first frequency range provided by the network element;

a receiver configured to receive signals representing data from the communications device using shared resources of an uplink of the first frequency range, wherein allocations of the shared resources are made by the network element and the uplink is within a first set of resources within the first frequency range; and circuitry configured to allocate a second set of resources for use in a second frequency range, the second set of resources being used for device-to-device (D2D) communications by the communications device, wherein the second set of resources are contiguous in time and frequency across an entirety of two contiguous subframes, wherein, within the two contiguous subframes, the second set of resources is divided in the time domain into a single D2D control region, plural D2D data regions and plural D2D reference symbol regions in accordance with a predetermined pattern, wherein the first frequency range and the second frequency range are different, and the first set of resources and the second set of resources are different.

3. The network element of claim 2, wherein the first set of resources in the first frequency range includes a control channel, and the second set of resources is contiguous in frequency with the control channel.

4. Circuitry for a communications device comprising:

transceiver circuitry configured to:

transmit signals representing data to a wireless communications system using shared resources of an uplink in a first frequency range, wherein the uplink is within a first set of resources within the first frequency range; and receive signals representing data from the wireless communications system using shared resources of a downlink of a first wireless access interface, wherein allocations of the shared resources are made by the wireless communications system; and processor circuitry configured to perform device-to-device (D2D) communications with another communications device using a second set of resources within a second frequency range, wherein the second set of resources is allocated for D2D communications by the wireless communications system, wherein the second set of resources are contiguous in time and frequency across an entirety of two contiguous subframes, wherein, within the two contiguous subframes, the second set of resources is divided in the time domain into a single D2D control region, plural D2D data regions and plural D2D reference symbol regions in accordance with a predetermined pattern, wherein the first frequency range and the second frequency range are different.

5. The circuitry of claim 4, wherein signals transmitted via the D2D control region provide an indication of the allocation of resources within the D2D data regions.

6. The circuitry of claim 5, wherein the transceiver circuitry is further configured to receive signals representing a resource allocation message in the D2D control region, the resource allocation message providing an indication of a set of resources of the D2D data regions; and the processor circuitry is further configured to perform D2D communications with the another communications device using the indicated set of resources.

7. The circuitry of claim 4, wherein the second set of resources is formed in a predetermined set of resources of the first set of resources.

8. The circuitry of claim 4, wherein the D2D reference symbol regions provide reference symbols for channel estimation at a receiving communications device.

9. The circuitry of claim 8, wherein the circuitry is configured to transmit and receive reference signals representing reference symbols in the reference symbol regions.

10. The circuitry of claim 9, wherein the D2D control region is associated with a D2D reference symbol region.

11. The circuitry of claim 4, wherein the transceiver circuitry is configured to receive an indication of the second set of resources from the wireless communications network.

12. The circuitry of claim 4, wherein the second frequency range is contiguous in frequency and smaller than and within the first frequency range.

13. The circuitry of claim 4, wherein the resources of the second set of resources are contiguous in frequency.

14. The circuitry of claim 4, wherein the uplink in the first frequency range includes control channels positioned toward the upper and lower frequencies of the first frequency range.

15. The circuitry of claim 14, wherein the second frequency range is formed using resources from the shared resources of the first frequency range.

16. The circuitry of claim 15, wherein the second frequency range is contiguous in frequency with at least one of the control channels.

17. The circuitry of claim 4, wherein the processor circuitry is configured to enter a reduced-power state in response to an absence of a D2D data region resource allocation relating to the communications device in a D2D control region.

* * * * *